(12) United States Patent
Ryu et al.

(10) Patent No.: US 8,392,111 B2
(45) Date of Patent: Mar. 5, 2013

(54) NAVIGATION METHOD, MEDIUM, AND SYSTEM

(75) Inventors: Hee-seob Ryu, Suwon-si (KR); Jong-ho Lea, Seongnam-si (KR); Yong-beom Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1327 days.

(21) Appl. No.: 11/882,699

(22) Filed: Aug. 3, 2007

(65) Prior Publication Data

US 2008/0033636 A1 Feb. 7, 2008

(30) Foreign Application Priority Data

Aug. 4, 2006 (KR) .................. 10-2006-0073930
Jul. 10, 2007 (KR) .................. 10-2007-0069198

(51) Int. Cl.
*G01C 21/00* (2006.01)
*G01C 21/34* (2006.01)

(52) U.S. Cl. ......... 701/410; 701/23; 701/29.1; 701/117; 701/411; 701/414; 701/418; 701/423; 701/424; 701/426; 701/428; 701/431; 701/454; 701/532; 701/533

(58) Field of Classification Search .......... 701/209, 701/210, 200; 359/124
See application file for complete search history.

(56) References Cited

U.S. PATENT DOCUMENTS

| 5,272,638 | A | * | 12/1993 | Martin et al. | 455/456.5 |
|---|---|---|---|---|---|
| 5,608,635 | A | * | 3/1997 | Tamai | 701/428 |
| 5,752,217 | A | * | 5/1998 | Ishizaki et al. | 701/410 |
| 5,938,720 | A | * | 8/1999 | Tamai | 701/209 |
| 5,978,732 | A | * | 11/1999 | Kakitani et al. | 701/411 |
| 5,991,688 | A | * | 11/1999 | Fukushima et al. | 701/411 |
| 5,991,689 | A | * | 11/1999 | Aito et al. | 701/416 |
| 6,134,501 | A | * | 10/2000 | Oumi | 701/533 |
| 6,240,364 | B1 | * | 5/2001 | Kerner et al. | 701/423 |
| 6,263,277 | B1 | * | 7/2001 | Tanimoto et al. | 701/533 |
| 6,295,503 | B1 | * | 9/2001 | Inoue et al. | 701/410 |
| 6,338,021 | B1 | * | 1/2002 | Yagyu et al. | 701/533 |
| 6,662,105 | B1 | * | 12/2003 | Tada et al. | 701/420 |
| 6,816,782 | B1 | * | 11/2004 | Walters et al. | 701/426 |
| 6,980,826 | B2 | * | 12/2005 | Yamaguchi | 455/556.1 |
| 7,146,173 | B2 | * | 12/2006 | Ando | 455/452.1 |
| 2001/0029425 | A1 | * | 10/2001 | Myr | 701/200 |

(Continued)

FOREIGN PATENT DOCUMENTS

| EP | 1473542 A1 * | 11/2004 |
|---|---|---|
| JP | 10-62184 | 3/1998 |
| JP | 2003-269978 | 9/2003 |
| KR | 10-2005-0034215 | 4/2005 |
| KR | 10-2006-0014225 | 2/2006 |
| KR | 10-2006-0017214 | 2/2006 |

OTHER PUBLICATIONS

JPO English Translation JP2003-269978A.*

*Primary Examiner* — Ian Jen
(74) *Attorney, Agent, or Firm* — Staas & Halsey LLP

(57) ABSTRACT

A method, medium, and system providing an updating traveling route to a user. The navigation system includes a route selecting unit to select an optimal route for an item to traverse based on calculated performance indexes of a plurality of alternative routes for the traversal, a performance index calculating unit to recalculate the performance indexes of the alternative routes during a current traversal of the selected optimal route based on received external information regarding sections of available traversals after a predetermined point in each alternative route beyond a current point of the current traversal, and a route changing unit to selectively update the optimal route during the current traversal based on the recalculated performance indexes.

36 Claims, 8 Drawing Sheets

U.S. PATENT DOCUMENTS

| | | | |
|---|---|---|---|
| 2003/0099014 A1* | 5/2003 | Egner et al. | 359/124 |
| 2004/0102896 A1* | 5/2004 | Thayer et al. | 701/207 |
| 2004/0148092 A1* | 7/2004 | Kim et al. | 701/200 |
| 2004/0181336 A1* | 9/2004 | Omi | 701/209 |

* cited by examiner

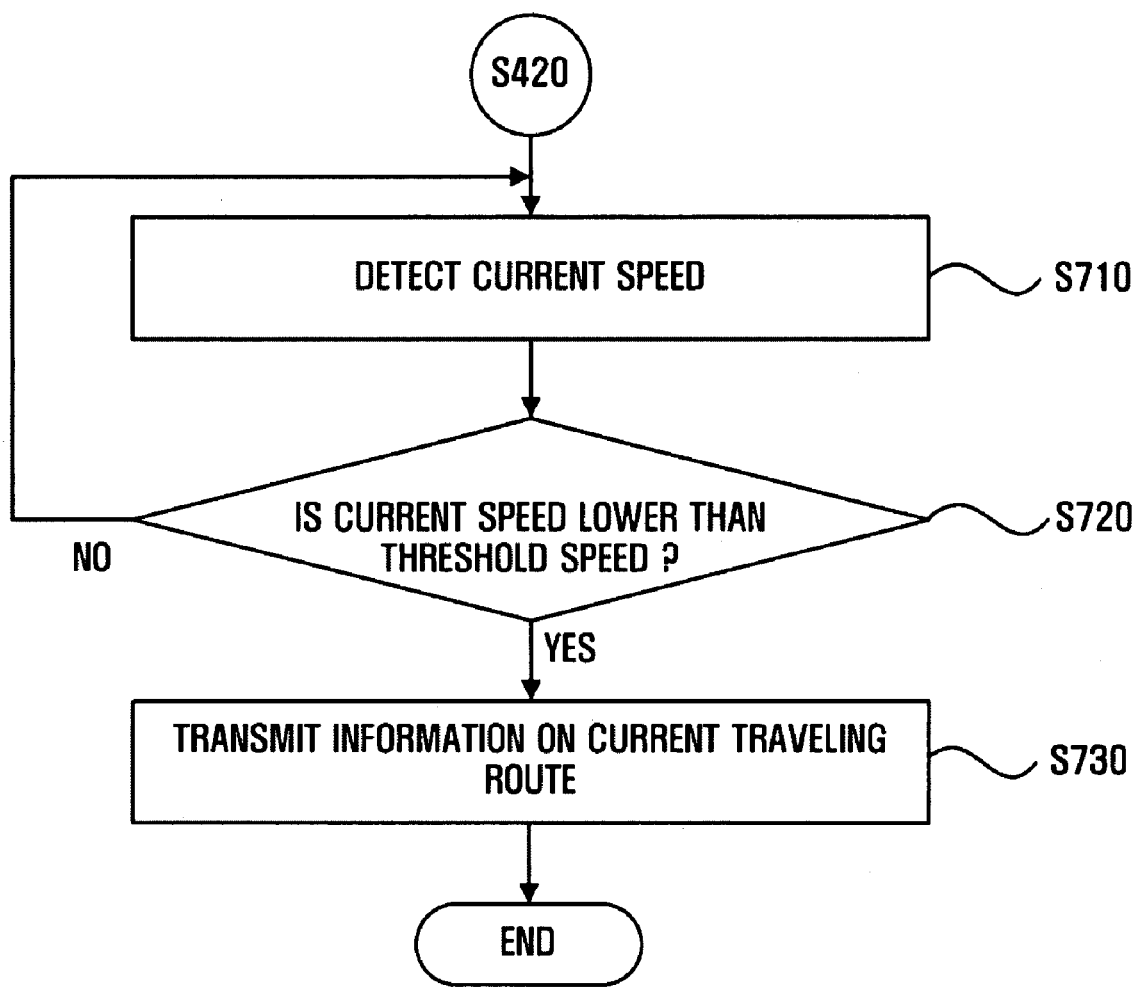

NAVIGATION METHOD, MEDIUM, AND SYSTEM

CROSS-REFERENCE TO RELATED APPLICATIONS

This application claims priority from Korean Patent Application Nos. 10-2006-0073930 and 10-2007-0069198 filed on Aug. 4, 2006 and Jul. 10, 2007, respectively, in the Korean Intellectual Property Office, the disclosures of which are incorporated herein by reference.

BACKGROUND

1. Field

Embodiments of the present invention relate to a navigation method, medium, and system, and more particularly, to a navigation method, medium, and system capable of providing information regarding an optimal traveling route and effectively transmitting the information.

2. Description of the Related Art

With the development of GPS (global positioning systems), and like positioning techniques, navigation services providing information on the positions of persons or objects and information on traveling routes have drawn attention. Such navigation systems receive destination information from a user, determine the optimal route from a current user position to a destination, and provide the determined optimal route to the user. These navigation systems determine the optimal route based on traffic information obtained or known at the start point of the user's travel.

However, when the start point to destination route guidance is performed based on the traffic information obtained or known at the start point, it is difficult to obtain real-time traffic information after the starting time. In addition, it is difficult to appropriately reflect real-time traffic conditions because traffic conditions can change while the user or vehicle is traveling. Here, such real-time traffic information could include information on accidents and weather, or other traffic increasing/decreasing occurrences, for example.

In order to overcome such drawbacks, techniques have been proposed for receiving updated traffic information from a navigation server in real time and determining the route of the vehicle based on the received traffic information.

However, even though such real-time traffic information may be received from a navigation server, the traffic information used to determine the route of the vehicle may be unavailable during the travel of the route before the user reaches the destination. For example, when the vehicle encounters traffic congestion at a point A of a first route, conventional navigation system select a second route capable of avoiding traffic congestion and provide the second route to the user. However, for example, even though traffic congestion occurs at point A, the traffic congestion may be reduced before the vehicle actually reaches point A. In this case, the second route provided to the user may actually not be the optimal route.

In addition, when the navigation system periodically receives such updated information from the navigation server, the overall amount of data transmitted therebetween increases.

SUMMARY

An aspect of an embodiment of the present invention is to provide a navigation method, medium, and system effectively transmitting/receiving data used to provide a traveling route and improve the availability of the traveling route provided to a user.

Additional aspects and/or advantages will be set forth in part in the description which follows and, in part, will be apparent from the description, or may be learned by practice of the invention.

To achieve the above and/or other aspects and advantages, embodiments of the present invention include a navigation system, including a route selecting unit to select an optimal route for an item to traverse based on calculated performance indexes of a plurality of alternative routes for the traversal, a performance index calculating unit to recalculate the performance indexes of the alternative routes during a current traversal of the selected optimal route based on received external information regarding sections of available traversals after a predetermined point in each alternative route beyond a current point of the current traversal, and a route changing unit to selectively update the optimal route during the current traversal based on the recalculated performance indexes.

To achieve the above and/or other aspects and advantages, embodiments of the present invention include a navigation method, including selecting an optimal route for an item to traverse based on calculated performance indexes of a plurality of alternative routes for the traversal, recalculating the performance indexes of the alternative routes during a current traversal of the selected optimal route based on received external information regarding sections of available traversals after a predetermined point in each alternative route beyond a current point of the current traversal, and selectively updating and outputting the optimal route during the current traversal based on the recalculated performance indexes.

BRIEF DESCRIPTION OF THE DRAWINGS

These and/or other aspects and advantages will become apparent and more readily appreciated from the following description of the embodiments, taken in conjunction with the accompanying drawings of which:

FIG. 8 illustrates a process of transmitting information on a current traveling route, such as in operation S430 in FIG. 5, according to an embodiment of the present invention.

DETAILED DESCRIPTION OF EMBODIMENTS

Figure 1:
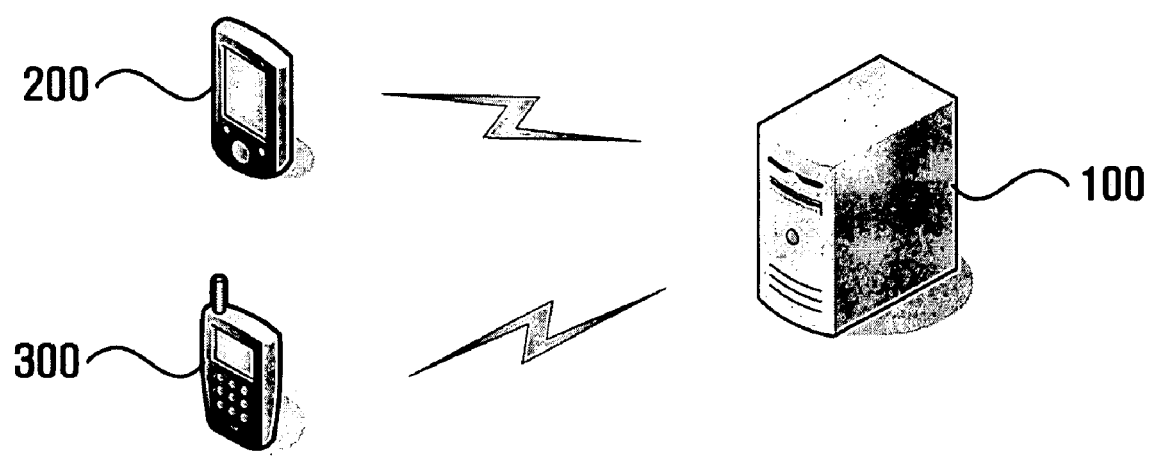
FIG. 1 illustrates a navigation system, according to an embodiment of the present invention.

Reference will now be made in detail to embodiments, examples of which are illustrated in the accompanying drawings, wherein like reference numerals refer to the like elements throughout. In this regard, embodiments of the present invention may, be embodied in many different forms and should not be construed as being limited to embodiments set forth herein. Accordingly, below, embodiments are described below to explain the present invention by referring to the figures.

Figure 2:
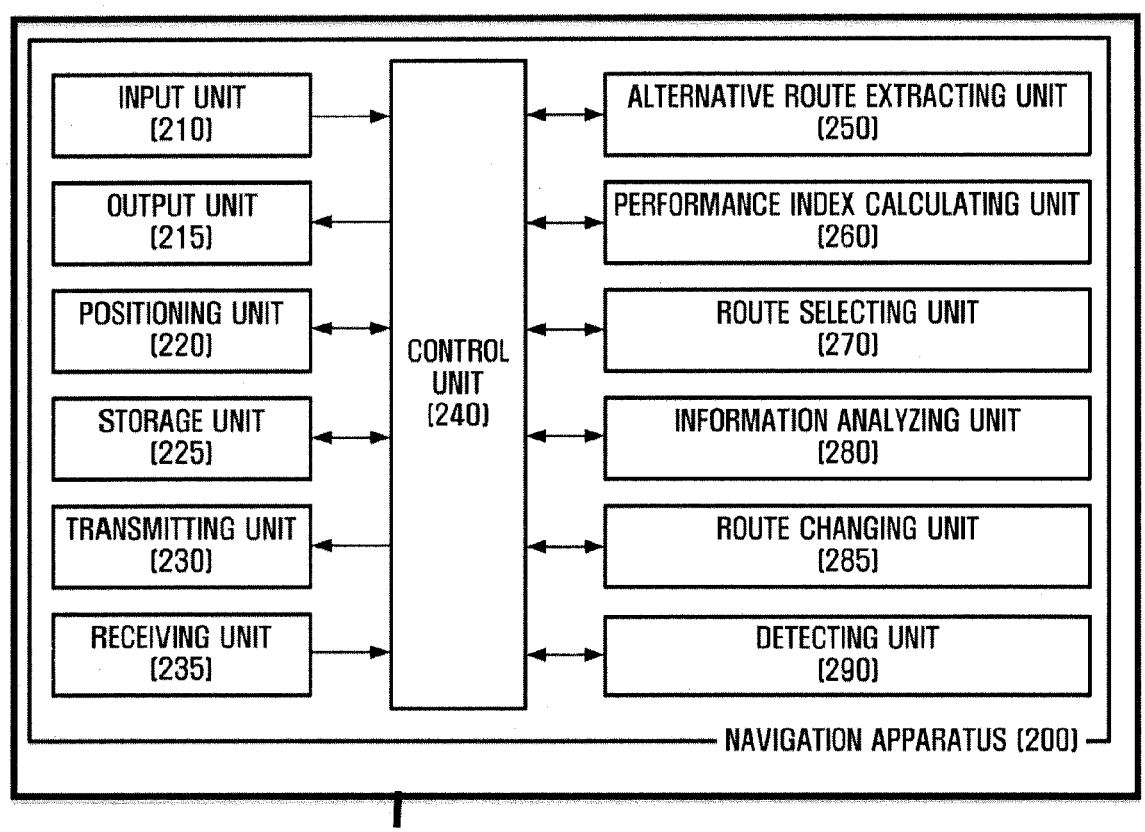
FIG. 2 illustrates a navigation node, according to an embodiment of the present invention.

FIG. 1 illustrates a navigation system, according to an embodiment of the invention. As shown in FIG. 1, the navigation system may include navigation apparatuses/nodes 200 and 300 and a navigation server 100. Though indicated as potential apparatuses, nodes 200 and 300 are not required to be complete apparatuses, but may be represented by systems of their own. Still further, though FIG. 2 illustrates such a node 200 as apparatus 200, node 200 or additional nodes are not limited to the descriptions herein. In addition, though references to a vehicle having or being a node are made below, alternate devices may act as same, as moving or non-moving nodes.

When detecting a specific condition, such as a reduction in speed, using the navigation nodes 200 and 300, for example, traveling along a predetermined route the navigation server 100 may collect from the navigation nodes 200 and 300, again as only examples, information on the route in which a specific condition is detected, such as identification information of the route, and information on the traveling speeds and positions of the navigation nodes 200 and 300. This collected information may further be stored on one or more databases, for example. In addition, when either of the navigation nodes 200 and 300 requests the navigation server 100 transmit information on potential routes for the respective node, the navigation server 100 may extract information regarding the traffic conditions of the requested routes from such a database, and provide the extracted information to the respective navigation node. Here, the navigation server 100 may determine whether a specific condition, such as traffic congestion, has or is occurring along the requested route. When such traffic congestion occurs along the requested route, the navigation server 100 may calculate how rapidly the traffic congestion is spreading based on information received from other navigation nodes in the congested area, for example, or other sources, and may then transmit the calculated result to the respective navigation nodes 200 and 300.

In this case, calculating how rapidly the traffic congestion will spread means to predict the effects of a specific condition (s) on traffic. The effect of a specific condition on traffic depends on characteristics of the specific condition, characteristics of the area where the specific condition occurs, and/or traffic characteristics of the time when the specific condition occurs, for example. According to one or more embodiments, as ways of predicting this effect of the specific condition on traffic, any of the following estimation techniques may be used: a tracing traffic congestion technique; a deterministic queuing theory technique; and a shockwave theory technique.

The deterministic queuing theory is generally used in a data communication field, and is applied to an intelligent transport system. Here, the deterministic queuing theory technique may use a deterministic queue that uses the time when the specific condition occurs, the duration of the specific condition, road capacity under a normal traffic condition, road capacity under a specific traffic condition, a demanded traffic rate, and the time for which some roads are closed as input variables to calculate a congested area for a predetermined period of time and for a time required until an arbitrary area is recovered to a normal state, for example.

The shockwave theory technique predicts traffic conditions by analyzing shockwaves of the upper and lower streams of a point where a specific condition occurs. When vehicles normally traveling encounter a specific condition, the shockwave theory technique may be used to estimate the speed of shockwaves to calculate the length of the queue and a congested area.

The above-mentioned techniques are, thus, available to effectively manage traffic conditions when a specific condition occurs in a traffic management system, but may need to have various variables. Therefore, the above-mentioned techniques require extensive databases. However, one or more embodiments of the present invention may continuously monitor only a variation in the speed of a vehicle or respective node traveling along a predetermined route, trace a change in a congested area, and check a variation in the position of a specific condition start point and traffic conditions of peripheral areas, for example, which can reduce the required transmitted data.

The navigation node 200 may detect whether a specific condition relates to the traveling conditions, and may further transmit the result of this detection to the navigation server 100 to enable the navigation server 100 to collect information on a travel route in a database. The navigation node 200 may further extract an optimal route among a plurality of alternative routes linking a user's current position to a destination, and provide information on the optimal route to the user. In order to perform this process, the navigation node 200 may request the navigation server 100 to transmit the alternative routes, receive information on the alternative routes, and calculate performance indexes of the alternative routes based on the received information. At that time, the navigation node 200 may predict a point on each of the alternative routes where a specific condition may occur, and calculate the performance indexes of the alternative routes based on the predicted result. When the performance indexes of the alternative routes are calculated, the navigation node 200 may select an optimal route based on the calculated performance indexes. When a vehicle travels along the selected optimal route, the navigation nodes 200 and 300 may update the optimal route while traveling according to the traffic conditions. In order to perform this process, the navigation node 200 may request the navigation server 100 to transmit information at predetermined intervals, thereby preventing unnecessary transmission and reception of data.

The navigation node 200 can be considered as a portable digital device. The digital device may be a device including a digital circuit capable of processing digital data, such as a PDA (personal digital assistant), a PMP (portable multimedia player), or a mobile phone, for example, noting that alternative embodiments are equally available. In addition, alternate nodes may further be available for providing information to the navigation server 100, without all or most of the capabilities of node 200.

FIG. 2 illustrates a navigation node 200, according to the embodiment of the invention. As shown in FIG. 2, the navigation node 200 may include a detecting unit 290, an input unit 210, a storage unit 225, a positioning unit 220, an alternative route extracting unit 250, a performance index calculating unit 260, a route selecting unit 270, an information analyzing unit 280, a route changing unit 285, a transmitting unit 230, a receiving unit 235, an output unit 215, and a control unit 240, for example. As described herein, in one or more embodiments, the navigation node 200 may be a navigation system within a vehicle 201.

The detecting unit 290 may detect a specific condition related to the movement of a user, or device, for example, such as the traveling speed of the vehicle, variation in the speed of the vehicle during a predetermined amount of time, or a brake operating pattern, etc., and forward the detected information to the information analyzing unit 280.

The input unit 210 may, thus, receive instructions from such a user. For example, the input unit 210 may receive information on points where the vehicle, or respective node, passes through and information on the destination, for example. In order to receive information, the input unit 210 may include a plurality of function keys, such as a menu key for displaying a menu supplied from a route providing device, directional keys for selecting the menu, an execution key for executing the selected menu, or other devices and input mechanisms. Such function keys may be realized by hardware and/or software, such that when the user pushes a key, the input unit 210 may generate a predetermined key signal, and the generated key signal may be transmitted to the control unit 240, for example.

The storage unit 225 may store map data that can be used to display positional information of the user, an algorithm for calculating the performance indexes of the alternative routes from the current position of the user to the destination, and data received from the navigation server 100, for example. In differing embodiments, the storage unit 225 may be one of non-volatile memory devices, such as a ROM (read only memory), a PROM (programmable read only memory), an EPROM (erasable programmable read only memory), and an EEPROM (electrically erasable programmable read only memory), volatile memory devices, such as a RAM (random access memory), and storage media, such as a hard disk drive (HDD), noting that alternative embodiments are equally available.

The positioning unit 220 may calculate a current position of the example user. In an embodiment, in order to calculate the current position, the positioning unit 220 may simultaneously receive radio waves from different GPS (global positioning system) satellites to obtain the positional information of the user, for example, the latitude and longitude of the user. Then, the positioning unit 220 may match data for the latitude and longitude with the map data stored in the storage unit 225. The positioning unit 220 may further include an antenna for simultaneously receiving radio waves from the GPS satellites and a GPS receiving unit 235 for calculating the position of the navigation node 200 based on the received radio waves. As noted above, though used herein as an example, embodiments of the present invention are not limited to such GPS navigation systems, and may be different positioning systems or used in conjunction with the same.

Figure 3A:
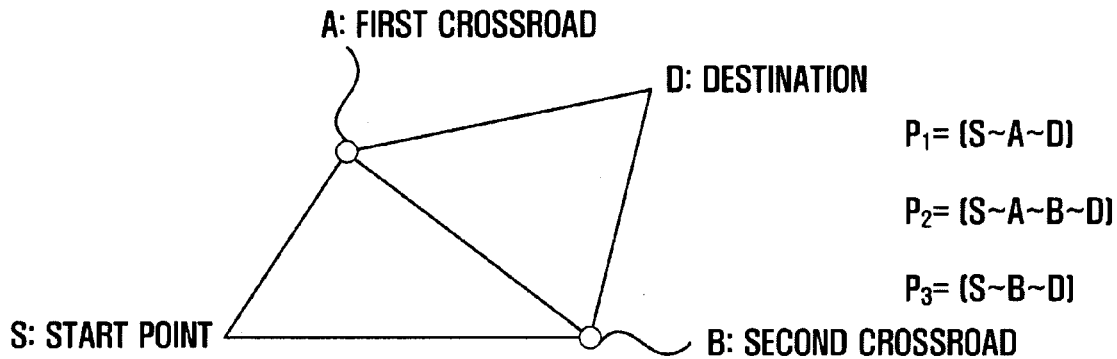
FIGS. 3A to 3C illustrate a methods of providing an optimal route, according to embodiments of the present invention.

When information on the points where the vehicle or node passes through and information on the destination are input through the input unit 210, for example, the alternative route extracting unit 250 may extract one or more alternative routes linking the current position of the user to the destination based on the map data stored in the storage unit 225. Then, the alternative route extracting unit 250 may divide each of the extracted alternative routes into a plurality of sections based on crossroads on each alternative route. For example, when the alternative route shown in FIG. 3A is extracted, the alternative route extracting unit 250 may divide an alternative route P1 into two sections, that is, a section between points S and A and a section between points A and D, based on a first crossroad. Similarly, the alternative route extracting unit 250 may divide an alternative route P2 into three sections, that is, a section between points S and A, a section between points A and B, and a section between points B and D, based on a second crossroad.

The performance index calculating unit 260 may, thus, further receive information on the divided sections from the navigation server 100, and calculate the performance indexes of the alternative routes extracted by the alternative route extracting unit 250. That is, in an embodiment, the performance index calculating unit 260 may add the expected times required to pass through the divided sections to calculate the performance indexes of the alternative routes. Here, the expected time required to pass through each divided section may be calculated based on one or more past traveling speeds of the vehicle or one or more current traveling speeds of the vehicle, or node, or it may be supplied from the navigation server 100. When a crossroad on an alternative route Pk is "i" and the time required for the vehicle or node to reach the crossroad i is $t_k^i$, a performance index $J_k$ of the alternative route Pk may be represented by the below Equation 1, for example.

$$J_k = \sum_{i=1}^{n} t_k^i \quad \text{Equation 1}$$

In this example, in FIG. 3A, the performance index calculating unit 260 may add the expected time required to pass through the section between points S and A and the expected time required to pass through the section between points A and D to calculate the performance index of the alternative route P1. Similarly, the performance index calculating unit 260 may add the expected time required to pass through the section between points S and A, the expected time required to pass through the section between points A and B, and the expected time required to pass through the section between points B and D to calculate the performance index of the alternative route P2. The performance index of the alternative route P3 may be calculated in a similar manner.

Meanwhile, when data supplied from the navigation server 100 is analyzed, and the analysis indicates that a specific condition, e.g., traffic congestion, is occurring, the performance index calculating unit 260 may predict a point on each alternative route where the vehicle or node encounters a specific conditional area.

Figure 3B:
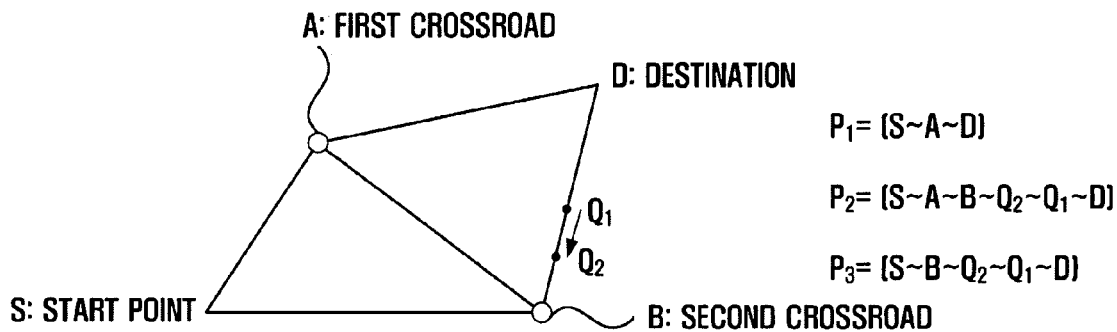
Figure 3C:
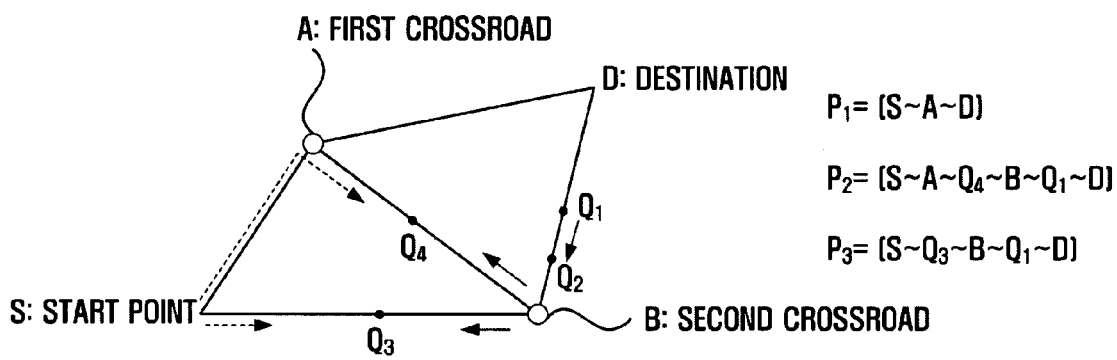

Specifically, as shown in the example of FIG. 3B, it is assumed that an accident occurs at a point Q1 and the traffic congestion is spreading or has spread in the direction Q2. The point Q1 indicates a point where a specific condition occurs, and the point Q2 indicates the end of an area that is affected by the accident. In this case, as shown in FIG. 3C, the performance index calculating unit 260 may predict a point Q4 on the alternative route P2 where the vehicle or node encounters a congested area and a point Q3 on the alternative route P3 where the vehicle or node encounters a congested area.

According to an embodiment, the performance index calculating unit 260 may predict a point on each alternative route where the vehicle, for example, encounters a specific conditional area based on the traveling speed of the example vehicle and the spread rate of the specific conditional area. Information on the spread rate of the specific conditional area may be provided from the navigation server 100, for example.

In another embodiment, the performance index calculating unit 260 may predict a point of each alternative route where the example vehicle encounters a congested area based on the aforementioned deterministic queuing theory, which will be described in greater detail with reference to FIG. 4.

Figure 4:
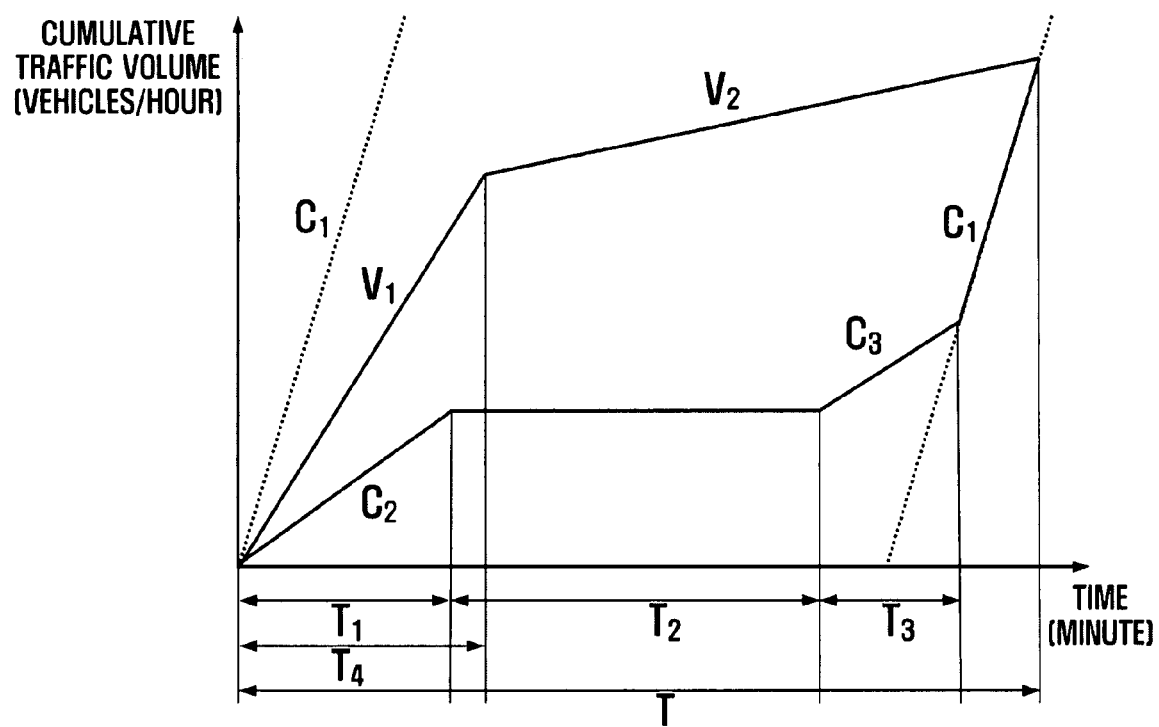
FIG. 4 illustrates a queuing diagram for calculating the time for which the vehicle is caught in a predetermined congested section, according to an embodiment of the present invention.

FIG. 4 illustrates a queuing diagram for calculating the time for which the example vehicle is caught in a predetermined traffic congested area, according to an embodiment of the present invention. In the queuing diagram of FIG. 4, the horizontal axis indicates time, in units of minutes, and the vertical axis indicates a cumulative traffic volume, in units of vehicles per hour. Here, in the queuing diagram, variables V1, V2, C1, C2, C3, T1, T2, T3, and T4 are defined as follows:

V1: Initial demanded traffic rate of a corresponding section, in units of vehicles per minute (vpm);

V2: Demanded traffic rate of a corresponding section that is corrected due to the detour of vehicles, in units of vpm;

C1: Capacity of a corresponding section, in units of vpm;

C2: Capacity of a corresponding section that is reduced due to a specific condition, in units of vpm;

C3: Capacity of a corresponding section that is corrected over time, in units of vpm;

T1: Time required from the occurrence of a specific condition to the closure of a corresponding section, in units of minutes;

T2: Time when the entire corresponding section is closed, in units of minutes;

T3: Time when a corresponding section is partially closed, in units of minutes;

T4: Time required from the occurrence of a specific condition to variation in the demanded traffic rate of a corresponding section, in units of minutes;

T: Time required for the capacity of a corresponding section to be recovered to a normal state, in units of minutes.

A database for such variables may be constructed in the navigation server 100, for example, such that the variables can be classified according to the kind of specific conditions. When a specific condition, e.g., traffic congestion, occurs in a predetermined section, the navigation server 100 may search variables related to the traffic congestion in the database. Then, the navigation server 100 may calculate the time T required for the capacity of the section to be recovered to a normal state based on the searched variables. Here, the time T may be calculated by the below Equation 2, for example.

$$T = \frac{[T_1(C_1 - C_2) + T_2 C_1 + T_3(C_1 - C_3) + T_4(V_1 - V_2)]}{(C_1 - V_2)} \quad \text{Equation 2}$$

Referring to FIG. 2 again, the performance index calculating unit 260 may divide a predetermined alternative route based on a predicted point on the alternative route, a point where a specific condition occurs, and a crossroad, and then calculate the performance index of the alternative route. For example, referring to FIG. 3C, the performance index calculating unit 260 may divide the alternative route P2 based on a predicted point Q4 on the alternative route P2, a point Q1 where an accident occurs, and crossroads A and B on the alternative route P2, for example. Then, the performance index calculating unit 260 may add the expected times required to pass through the divided sections to calculate the performance index of the alternative route P2. Specifically, in this example, the performance index calculating unit 260 may add the expected time required to pass through a section between points S and A, the expected time required to pass through a section between points A and Q4, the expected time required to pass through a section between points Q4 and B, the expected time required to pass through a section between points B and Q1, and the expected time required to pass through a section between points Q1 and D to calculate the performance index of the alternative route P2.

In FIG. 3C, the performance index of the alternative route P3 may be calculated in a similar manner as that described above. That is, the performance index calculating unit 260 may divide the alternative route P3 based on a predicted point Q3 on the alternative route P3, the point Q1 where an accident occurs, and the crossroad B on the alternative route P3. Then, the performance index calculating unit 260 may add the expected times required to pass through the divided sections to calculate the performance index of the alternative route P3. Specifically, here, the performance index calculating unit 260 may add the expected time required to pass through a section between points S and Q3, the expected time required to pass through a section between points Q3 and B, the expected time required to pass through a section between points B and Q1, and the expected time required to pass through a section between points Q1 and D, for example, to calculate the performance index of the alternative route P3.

In this example, the times required to pass through the divided sections on a predetermined alternative route are added up to calculate the performance index of the alternative route, but embodiments of the present invention are not limited thereto. The performance index of an alternative route may be calculated based on various factors other than the expected times required to pass through the divided sections, such as the distances of divided sections and fares for the use of the divided sections. Specifically, here, it is assumed that each alternative route is divided into n sections. In this case, when the time required to pass through an i-th section among the n divided sections on an alternative route Pk, the distance thereof, and a fare therefore are referred to as $t_k^i$, $d_k^i$, and $e_k^i$, respectively, a performance index Jk of the alternative route Pk can be represented by the below Equation 3, for example.

$$J_k = \sum_{i=1}^{n} (w_k^i \cdot t_k^i + d_k^i + e_k^i) \quad \text{Equation 3}$$

In Equation 3, $w_k^i$ means a weight of the time for passing through the i-th section. The weight indicates the amount of the effect of the divided section on the entire route, and can be calculated by the reciprocal of the time for passing. The weight is optional to calculate the performance index. In addition to the time required to pass through each divided section on a predetermined alternative route, the distance of the divided section, and a fare for the divided section, e.g., a traffic signal system of the divided section, information indicating whether the divided section is a school zone, and information indicating whether the divided section is an accident-prone area, may be used to calculate the performance index. These information items may be stored in the storage unit 225 or they may be provided from the navigation server 100, for example.

When the user moves along the optimal route, the performance index calculating unit 260 may recalculate the performance indexes of the alternative routes at the request of the information analyzing unit 280, which will be described in greater detail below, based on information received from the navigation server 100. The recalculated performance indexes may be provided to the route changing unit 285, which will also be described in greater detail below.

The route selecting unit 270 may select an optimal route from the alternative routes based on the performance indexes, e.g., as calculated by the performance index calculating unit 260. That is, the route selecting unit 270 may select an alternative route having a minimum performance index among the alternative routes. For example, when the performance indexes J1, J2, and J3 of the alternative routes shown in FIG. 3A have values shown in the following Table 1, the route selecting unit 270 may select the alternative route P1 as the optimal route.

TABLE 1

| Alternative route | Performance index |
| --- | --- |
| $P_1 = (S\sim A\sim D)$ | $J_1 = 20 + 25 = 45$ |
| $P_2 = (S\sim A\sim B\sim D)$ | $J_2 = 20 + 30 + 25 = 75$ |
| $P_3 = (S\sim B\sim D)$ | $J_3 = 20 + 25 = 50$ |

The control unit 240 may, thus, control and interconnect the components of the navigation node 200. For example, in an embodiment, when a key signal is input through the input unit 210, the control unit 240 controls the components according to an instruction corresponding to the key signal. In addition, the control unit 240 may calculate the time required for the vehicle or node traveling along the optimal route to reach a predetermined crossroad on the route. For example, when the user or device moves along the route P1 in FIG. 3A, the control unit 240 may calculate the expected time required for the user to reach the first crossroad. The calculated result may then be forwarded to the information analyzing unit 280, which will be described in greater detail below.

When the result calculated by the control unit 240 is within a predetermined time, the information analyzing unit 280 may generate an information request signal for requesting information on the sections after the crossroad for all of the alternative routes. Then, the information analyzing unit 280 may transmit the information request signal to the navigation server 100, for example, through the transmitting unit 230. As one example, when the expected time required for the user to reach the first crossroad is less than 10 minutes, the information analyzing unit 280 may transmit an information request signal, e.g., for requesting information on the sections after the first crossroad, i.e., the section between points A and D, the section between points A and B, and the section between points B and D, to the navigation server 100 through the transmitting unit 230. In an embodiment, the information request signal may include identification information on each section. That is, the information request signal may include identification information on the section between points A and D, the section between points A and B, and the section between points B and D, for example.

When the detecting unit 290 detects a specific condition related to the traveling state of the vehicle or respective node, the information analyzing unit 280 may transmit information on the section in which the vehicle or node is traveling to the navigation server 100, for example, according to the result of the detection. In one example, when the traveling speed of the vehicle is slower than a predetermined speed, the detecting unit 290 determines that traffic congestion occurs in the section in which the vehicle is traveling. Then, the information analyzing unit 280 generates a signal indicating that traffic congestion occurs in the current section and transmits the signal to the navigation server 100 through the transmitting unit 230. The signal transmitted to the navigation server 100 may include at least one of the following example information items: identification information on the section in which a specific condition is detected; the time when the specific condition is detected; information on the position of the vehicle where the specific condition is detected; and information on the traveling speed of the vehicle when the specific condition is detected, noting that alternate information may be available.

When the performance indexes of the alternative routes are recalculated, e.g., based on information from the navigation server 100, the route changing unit 285 may update an optimal route based on the recalculated performance indexes. That is, the route changing unit 285 may reset an alternative route having the minimum performance index among the recalculated performance indexes to the optimal route. For example, when the performance indexes of the routes P1 and P2, based on the first crossroad, are recalculated and the performance index of the route P2 is smaller than that of the route P1, the route changing unit 285 may reset the route P2 to the optimal route.

The output unit 215 may output the processed result of the instruction as audio or video, for example. In such an embodiment, the output unit 215 may output the current traveling speed of the user or the update result of the optimal route as audio or video, and in order to perform the output process, the output unit 215 may include at least one of a speaker for outputting sound or a display unit for displaying images. Such a display unit may be separately provided from the input unit 210 from the viewpoint of a hardware structure, or it may be integrated with the input unit as a touch screen, from the viewpoint of a hardware structure, again noting that alternatives are equally available.

Figure 5:
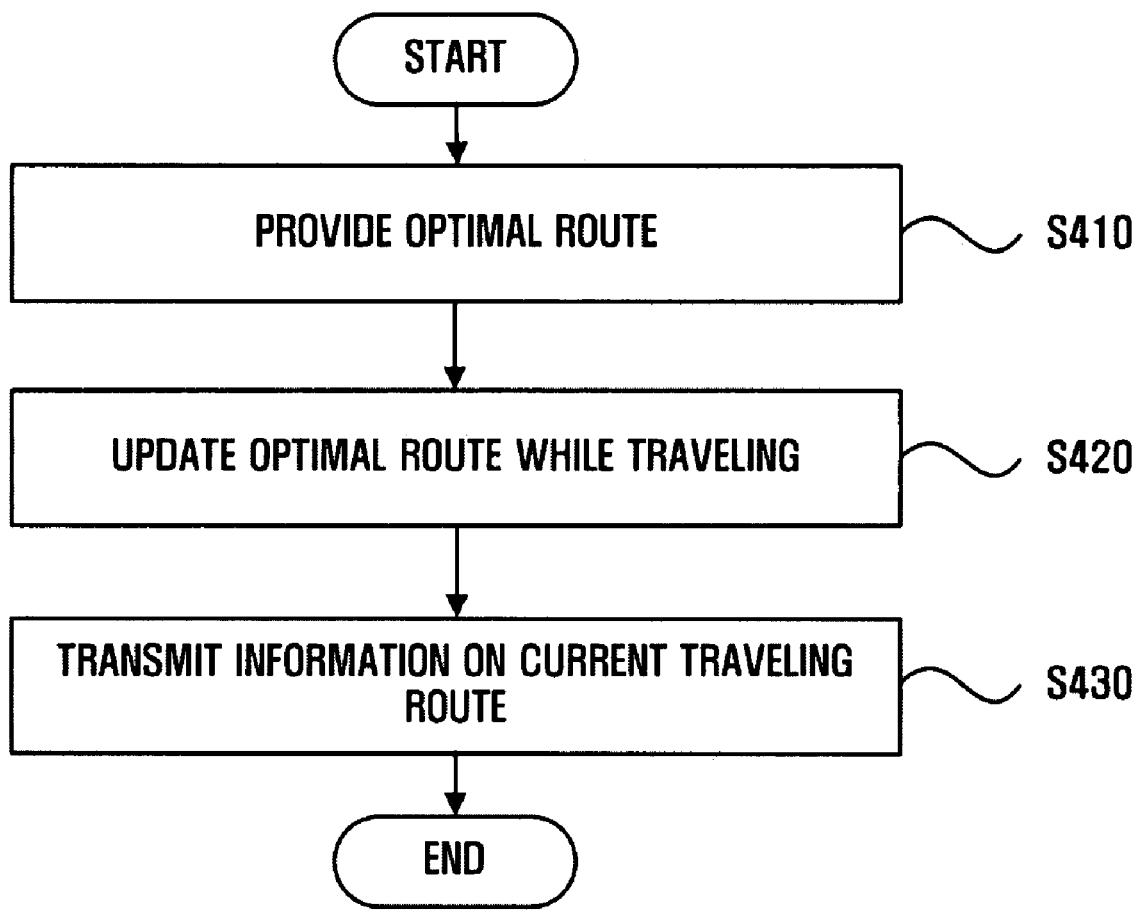
FIG. 5 illustrates a navigation method, according to an embodiment of the invention.

FIG. 5 illustrates an operation of a navigation node 200, according to the embodiment of the invention. As shown in FIG. 5, an optimal route may be provided, in operation S410, the optimal route may be updated while the vehicle is traveling, in operation S420, and information on the current route may be provided to an example navigation server 100, in operation S430.

Figure 6:
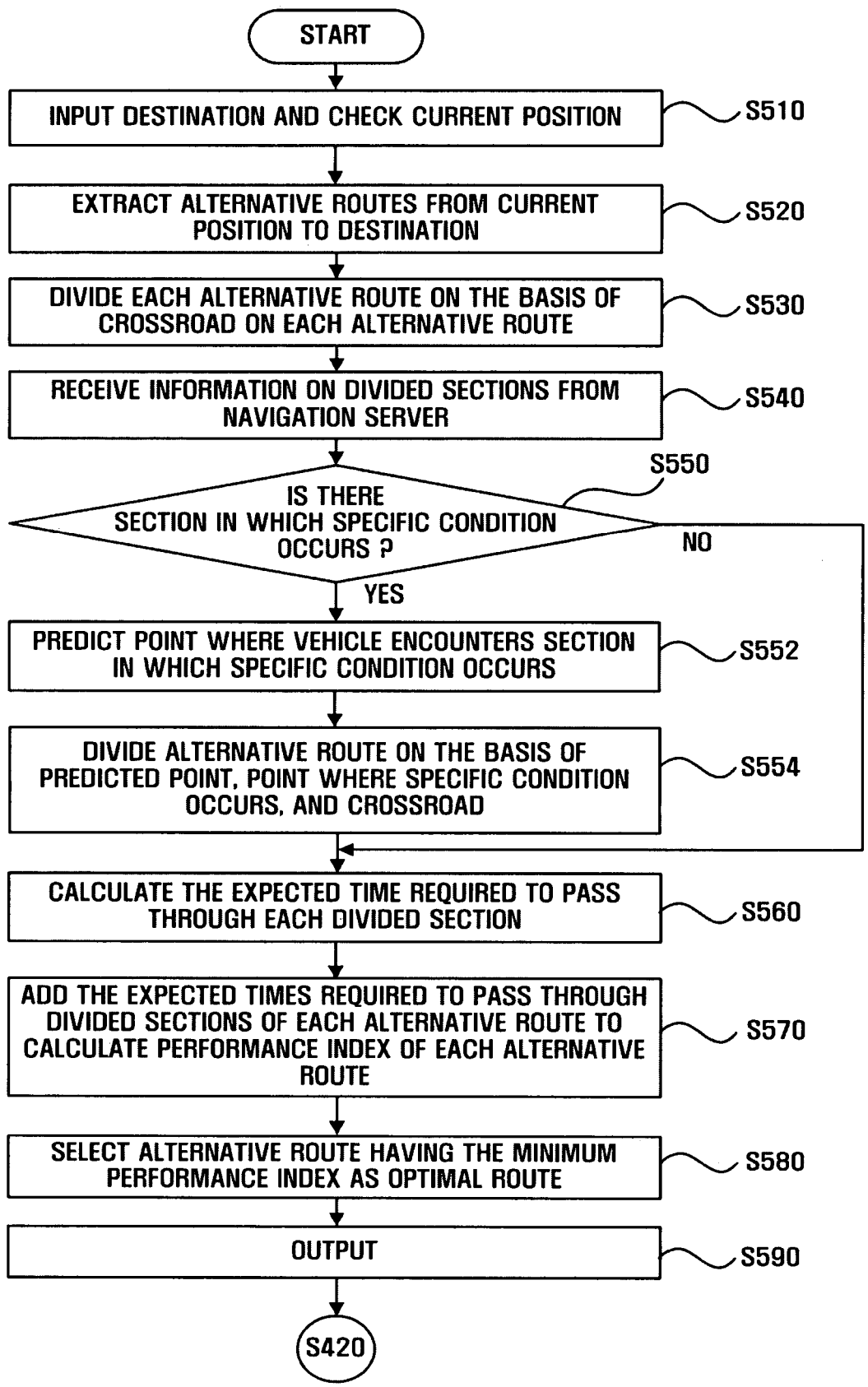
FIG. 6 illustrates a process of providing an optimal route, such as in operation S410 in FIG. 5, according to an embodiment of the present invention.

FIG. 6 illustrating a process of providing an optimal route, such as in operation S410 in FIG. 5, according to an embodiment of the present invention.

When information on points through which a vehicle or node passes and information on the destination are input, for example, radio waves from a GPS satellite may be received and positional information of the user, vehicle, or node, obtained, and the latitude and longitude of the example user, calculated, e.g., by the positioning unit 220, in operation S510.

When information on the current position of the user is obtained, the alternative routes may be extracted, e.g., by the alternative route extracting unit 250, from the current position of the user to the destination based on the information on the current position of the example user and that data may then be stored, e.g., in the storage unit 225, in operation S520. In this case, one or more alternative routes may be extracted.

Then, each alternative route may be divided into a plurality of sections based on crossroads on the alternative route, e.g., by the alternative route extracting unit 250, in operation S530. In such an embodiment, when the example alternative routes shown in FIG. 3A are extracted, the alternative route extracting unit 250 divides the alternative route P1 into the section between points S and A and the section between points A and D based on the first crossroad. Similarly, in this example, the alternative route extracting unit 250 divides the alternative route P2 into the section between points S and A, the section between points A and B, and the section between points B and D based on the first and second crossroads. In addition, here, the alternative route extracting unit 250 divides the alternative route P3 into the section between points S and B and the section between points B and D based on the second crossroad.

Subsequently, a signal for requesting information on the divided sections may be transmitted, e.g., by the alternative route extracting unit 250 to the navigation server 100 through the transmitting unit 230.

When data for the divided sections, for example, data including information about whether traffic congestion occurs, is received from the example navigation server 100, e.g., by the receiving unit 235, in operation S540, it may be determined whether the section in which a specific condition, that is, traffic congestion, occurs is found to exist based on the received data, e.g., by the performance index calculating unit 260, in operation S550.

When it is determined that there is no section having traffic congestion in operation S550, the expected times required to pass through the sections may be calculated based on the past traveling speed of the vehicle, for example, e.g., by the performance index calculating unit 260, in operation S560. When the example vehicle is traveling, the expected times required to pass through the sections may be calculated based on the current traveling speed of the vehicle, for example.

When the expected times required to pass through the sections are calculated, the expected times required to pass through all of the sections on the alternative route may be added to calculate the performance index of the alternative route, e.g., by the performance index calculating unit 260, in operation S570. For example, in the aforementioned discussion regarding FIG. 3A, the performance index calculating unit 260 may add the expected time required to pass through the section between points S and A and the expected time required to pass through the section between points A and D to calculate the performance index of the alternative route P1. The performance indexes of the alternative routes P1 and P2 may further be calculated in a similar manner.

On the other hand, when it is determined that there is a section having traffic congestion in operation S550, a point may be predicted on the alternative route where the vehicle encounters the congested area, e.g., by the performance index calculating unit 260, in operation S552. Thus, in one example, the performance index calculating unit 260 may predict a point of the alternative route where the example vehicle encounters the congested area based on the traveling speed of the vehicle and the spread rate of the congested area. Alternatively, the performance index calculating unit 260 may predict a point of the alternative route where the example vehicle encounters the congested area using the aforementioned deterministic queuing theory technique.

Then, the alternative route may be divided based on a predicted point on the alternative route, a point where traffic congestion starts, and a crossroad on the alternative route, e.g., by the performance index calculating unit 260, in operation S554. In one example, it is assumed that an accident occurs at a point Q1 and traffic congestion spreads in the direction Q2, as shown in FIG. 3B. In this case, as shown in FIG. 3C, the performance index calculating unit 260 may predict a point Q3 on the alternative route P3 where the vehicle encounters the congested area based on the past traveling speed of the vehicle and the spread rate of the congested area. Then, here, the performance index calculating unit 260 may divide the alternative route P3 into the section between points S and Q3, the section between points Q3 and B, the section between points B and Q1, and the section between points Q1 and D.

Subsequently, the expected time required to pass through the section between points S and Q3, the expected time required to pass through the section between points Q3 and B, the expected time required to pass through the section between points B and Q1, and the expected time required to pass through the section between points Q1 and D to calculate the performance index of the alternative route P3 may be added, e.g., by the performance index calculating unit 260, in operation S570.

When the performance indexes of all of the alternative routes are calculated, e.g., by the performance index calculating unit 260, an alternative route having the minimum performance index may be selected as an optimal route, e.g., by the route selecting unit 270, in operation S580. Thus, in one example, when the alternative routes P1, P2, and P3 have the performance indexes shown in Table 1 for FIG. 3A, the route selecting unit 270 may select the alternative route P1 as the optimal route. Information on the optimal route, e.g., selected by the route selecting unit 270, may be output through the output unit 215, in operation S590.

Next, the optimal route may be updated based on traffic conditions while traveling, e.g., by the operation of the navigation node 200, as will be described with greater detail below with reference to FIG. 7.

Figure 7:
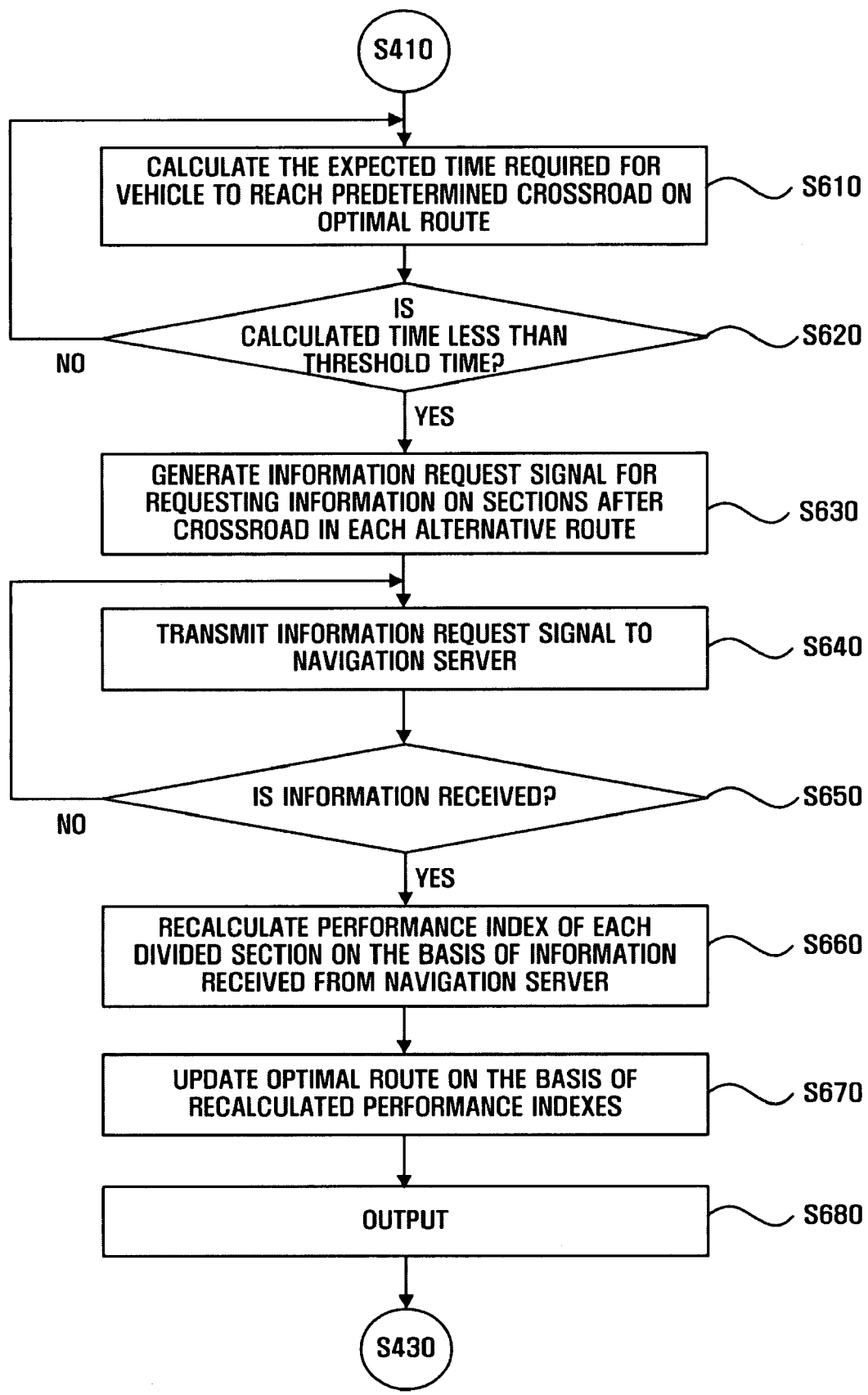
FIG. 7 illustrates a process of updating an optimal route, such as in operation S420 in FIG. 5, according to an embodiment of the present invention.

FIG. 7 illustrates an updating the optimal route, such as shown in operation S420 in FIG. 5, according to an embodiment of the present invention.

When the vehicle or node travels along the optimal route, e.g., as selected by the route selecting unit 270, the time required for the example vehicle to reach a predetermined crossroad on the optimal route may be calculated, e.g., by the information analyzing unit 280, in operation S610. In one example, when the example vehicle travels along the route P1 shown in FIGS. 3A to 3C, the information analyzing unit 280 may calculate the expected time required for the vehicle to reach the first crossroad.

When the calculated result is determined to be less than a predetermined time, for example, 10 minutes, in operation S620, an example navigation server 100 may be requested, e.g., by the information analyzing unit 280, to transmit information on the sections after the first crossroad, that is, the section between points A and D, the section between points A and B, and the section between points B and D, among the divided sections of the alternative route including the first crossroad. In order to request the information, an information request signal including identification information of the sections may be generated, e.g., by the information analyzing unit 280, in operation S630, and the signal may be transmitted to the example navigation server 100, e.g., through the transmitting unit 230, in operation S640.

In this example, the navigation server 100 may search the information on the section requested by the navigation node 200, for example, information indicating whether traffic congestion occurs in the section, information on the position of a congested area, information on the time when traffic congestion occurs, and information on the traveling speed of the vehicle in the section, for example. When information on the requested section is searched, the example navigation server 100 may transmit the searched information to the navigation node 200.

If it is determined that the receiving unit 235 has received information from the navigation node 200, in operation S650, the performance indexes of the alternative routes may be recalculated based on the received information, e.g., by the performance index calculating unit 260. In one embodiment, the performance index calculating unit 260 recalculates the performance indexes of the divided sections after the first crossroad to acquire the performance indexes of the alternative routes. That is, here in this example, the performance index calculating unit 260 recalculates the performance index of the section between points A and D to acquire the performance index of the route P1, and adds the performance index of the section between points A and B and the performance index of the section between points B and D to acquire the performance index of the route P2. As described with reference to FIG. 6, in such an embodiment, the performance index calculating unit 260 recalculates the performance indexes of the alternative routes according to whether the section in which a specific condition occurs exists, which makes it possible to improve the availability of the optimal route.

When the performance indexes of the alternative routes are recalculated, the optimal route may be maintained or updated based on the recalculated performance indexes, e.g., by route changing unit 285, in operation S670. For example, in an embodiment, when the performance index of the route P1 is less than that of the route P2, the route changing unit 285 may maintain the original optimal route.

Here, in this example, when the performance index of the route P2 is less than that of the route P1, the route changing unit 285 may change the optimal route to the section between points A and B and the section between points B and D based on the first crossroad, as an updated optimal route. In addition, depending on embodiment, information on the selective update of the optimal route may be output as audio and video through the output unit 215, for example.

Next, an operation of the navigation node 200 providing information on the section in which the vehicle is traveling to a navigation server 100, for example, will be described with reference to FIG. 8.

FIG. 8 illustrates a process of transmitting information on a section in which a vehicle or node is traveling, such as in operation S430 in FIG. 5, according to an embodiment of the present invention.

One or more traveling speeds of the vehicle or node may be detected, e.g., by the detecting unit 290 of the navigation node 200, in operation S710.

As the result of the detection, when it is determined that a detected traveling speed of the vehicle or node is lower than a predetermined threshold value, in operation S720, it may be determined that traffic congestion is occurring in the current section, e.g., by the information analyzing unit 280. Then, a signal indicating that traffic congestion is occurring in the current section may be generated and transmitted a navigation server 100, for example, e.g., by the information analyzing unit 280 and through the transmitting unit 230, in operation S730. In an embodiment, the signal transmitted to the example navigation server 100 may include identification information on the divided section, information on the current position of the vehicle in the section, information on the current time, and information on the traveling speed of the vehicle in the section, for example.

In such an embodiment, traffic conditions in the current section may be determined based on one or more traveling speeds of the vehicle or node, noting that embodiments of the present invention are not limited thereto. Various criteria may be used to determine the traffic conditions of the current section. For example, the traffic conditions of the current section may be determined by detecting a variation in the speed of the vehicle or node for a predetermined time or according to whether the vehicle's breaks are applied or the node stops unexpectedly.

Embodiments of the present invention have been described above with reference to flowchart illustrations of a navigation method, medium, and system. Accordingly, it should be understood that each block of the flowchart illustrations, and combinations of blocks in the flowchart illustrations, can be implemented by computer readable code. These computer readable codes can be provided to a processor of a general purpose computer, special purpose computer, or other programmable data processing element to produce a machine, such that the instructions, which execute via the processor of the computer or other programmable data processing element, create mechanisms for implementing the operations specified in the flowchart block or blocks.

These computer readable codes may also be stored in a computer usable or computer-readable memory that can direct a computer or other programmable data processing element to operate in a particular manner, such that the code stored in the computer usable or computer-readable memory produce an article of manufacture including instruction mechanisms that implement the operation specified in the flowchart block or blocks.

The computer readable codes may also be loaded onto a computer or other programmable data processing element to cause a series of operations to be performed on the computer or other programmable elements to produce a computer implemented process such that the codes that execute on the computer or other programmable element provide ways for implementing the operations specified in the flowchart block or blocks.

Still further, each block of the flowchart illustrations may represent a module, segment, or portion of code, which include one or more executable instructions for implementing the specified logical function(s). It should also be noted that in some alternative implementations, the operations noted in the blocks may occur out of the order. For example, two blocks shown in succession may in fact be executed substantially concurrently or the blocks may sometimes be executed in the reverse order, depending upon the functionality involved.

With that being said, and in addition to the above described embodiments, embodiments of the present invention can thus be implemented through such computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments have been shown and described, it would be appreciated, by those skilled in the art that changes may be made in these embodiments without departing from the principles and spirit of the invention, the scope of which is defined in the claims and their equivalents.

What is claimed is:

1. A navigation system included in an item, comprising:
    a route selecting unit to select an optimal route to a destination point for traversal by the item based on calculated performance indexes of a plurality of alternative routes to the destination point for the traversal;
    a performance index calculating unit to recalculate the performance indexes of the alternative routes during a current traversal of the selected optimal route based on received congestion information from a remote device, remote from the navigation system, of respectively identified sections of available traversals after a predetermined point in each of the alternative routes beyond a current point of the current traversal;

a requesting unit to request, from the remote device, congestion information regarding each of the respectively identified sections of the available traversals after the predetermined point in one or more of the alternative routes beyond the current point of the current traversal; and a route changing unit to selectively update the optimal route during the current traversal based on the recalculated performance indexes, wherein the remote device provides congestion information on a plurality of positions or sections to one or more items for respective item traversals, and wherein the item and the one or more items are mobile devices.

2. The navigation system of claim 1, wherein the requesting unit requests, from the remote device, the congestion information regarding the sections of the available traversals after the predetermined point in each of the alternative routes beyond the current point of the current traversal.

3. The navigation system of claim 1, wherein the remote device is a navigation server comprising a database with the congestion information on the plurality of positions or sections available for traversal.

4. The navigation system of claim 1, wherein the predetermined point is a predetermined crossroad in each of the alternative routes before the item traveling along the current traversal reaches the predetermined crossroad.

5. A navigation system, comprising:
a route selecting unit to select an optimal route to a destination point for traversal by an item to traverse based on calculated performance indexes of a plurality of alternative routes to the destination point for the traversal;

a performance index calculating unit to recalculate the performance indexes of the alternative routes during a current traversal of the selected optimal route based on received external information of respectively identified sections of available traversals after a predetermined point in each of the alternative routes beyond a current point of the current traversal;

a requesting unit to request, from an external device, the external information regarding each of the respective identified sections of the available traversals after the predetermined point in one or more of the alternative routes beyond the current point of the current traversal; and a route changing unit to selectively update the optimal route during the current traversal based on the recalculated performance indexes, wherein the item is a vehicle and the navigation system is a navigation system within the vehicle.

6. The navigation system of claim 1, wherein a performance index of an alternative route is a sum of performance indexes of a plurality of sections that are divided from a corresponding predetermined point on the alternative route.

7. The navigation system of claim 6, wherein the performance index is determined by at least one of a time required to pass through each divided section, the distance of each divided section, information on a fare for each divided section, and traffic information of each divided section.

8. The navigation system of claim 1, wherein, when a specific condition is identified by the remote device as occurring in a predetermined alternative route, the performance index calculating unit predicts an affected point where the item will encounter an area that is affected by the specific condition, and recalculates the performance indexes of the alternative routes based on the performance indexes of the sections divided from the predetermined point, the predicted affected point, and an identified point where the specific condition originates or occurs.

9. The navigation system of claim 8, wherein the performance index calculating unit predicts the affected point based on a traveling speed of the item and a determined spread rate for the specific condition in the area.

10. The navigation system of claim 8, wherein the performance index calculating unit predicts the affected point based on at least one of a deterministic queuing theory and a shockwave theory.

11. The navigation system of claim 1, wherein one or more of other items traversing routes in respective sections of available traversals beyond the current point of the current traversal provide the congestion information to the navigation system regarding the respective sections of the available traversals beyond the current point of the current traversal.

12. The navigation system of claim 1, further comprising:
an output unit to selectively output information on the optimal route and the updated optimal route.

13. The navigation system of claim 1, further comprising:
a detecting unit to detect a specific condition related to a traveling state of the item; and a transmitting unit to transmit congestion information on a corresponding section in which the specific condition is detected to the remote device for provision to other navigation systems.

14. The navigation system of claim 13, wherein the specific condition is a variation in a traversal speed of the item.

15. The navigation system of claim 1, wherein the performance index calculating unit recalculates the performance indexes of the alternative routes during the current traversal of the selected optimal route based on the received external information if a request for the received congestion information is sent to the remote device, where the request is sent to the remote device when a traversal time for the item to reach the predetermined point meets a predetermined threshold time.

16. A navigation method, comprising:
selecting an optimal route to a destination point for traversal by an item based on calculated performance indexes of a plurality of alternative routes to the destination point for the traversal;

recalculating the performance indexes of the alternative routes during a current traversal of the selected optimal route based on received congestion information from a remote device of respectively identified sections of available traversals after a predetermined point in each of the alternative routes beyond a current point of the current traversal;

requesting from the remote device the congestion information regarding the sections of the available traversals after the predetermined point in one or more of the alternative routes beyond the current point of the current traversal; and selectively updating and outputting the optimal route during the current traversal based on the recalculated performance indexes, wherein the remote device provides congestion information on a plurality of positions or sections to one or more items for respective item traversals, and is remote from a navigation system, of the item, performing the selecting, recalculating, and selective updating.

17. The navigation method of claim 16, wherein the requesting from the remote device of the congestion information is regarding the sections of the available traversals after the predetermined point in each of the alternative routes beyond the current point of the current traversal.

18. The navigation method of claim 16, wherein the predetermined point is a predetermined crossroad in each of the alternative routes before the item traveling along the current traversal reaches the predetermined crossroad.

19. The navigation method of claim 16, wherein the item is a vehicle and the navigation system is a navigation system within the vehicle.

20. The navigation method of claim 16, wherein a performance index of an alternative route is a sum of performance indexes of a plurality of sections that are divided from a corresponding predetermined point on the alternative route.

21. The navigation method of claim 20, wherein the performance index is determined by at least one of a time required to pass through each divided section, the distance of each divided section, information on a fare for each divided section, and traffic information of each divided section.

22. The navigation method of claim 16, wherein, when a specific condition is identified by the remote device as occurring in a predetermined alternative route, the navigation method further comprises predicting an affected point where the item will encounter an area that is affected by the specific condition, and recalculating the performance indexes of the alternative routes based on the performance indexes of the sections divided from the predetermined point, the predicted affected point, and an identified point where the specific condition originates or occurs.

23. The navigation method of claim 22, wherein the predicting of the affected point further comprises predicting the affected point based on a traveling speed of the item and a determined spread rate for the specific condition in the area.

24. The navigation method of claim 22, wherein the predicting of the affected point further comprises predicting the affected point based on at least one of a deterministic queuing theory and a shockwave theory.

25. The navigation method of claim 16, further comprising providing, from one or more of other items traversing routes in respective sections of available traversals beyond the current point of the current traversal, the congestion information to the navigation system regarding the respective sections of the available traversals beyond the current point of the current traversal.

26. The navigation method of claim 16, further comprising:
detecting a specific condition related to a traveling state of the item; and
transmitting congestion information on a corresponding section in which the specific condition is detected to the remote device for provision to external navigation systems.

27. The navigation method of claim 26, wherein the specific condition is a variation in a traversal speed of the item.

28. The navigation method of claim 16, further comprising selectively requesting the received congestion information based a traversal time for the item to reach the predetermined point meeting a predetermined threshold time.

29. At least one non-transitory medium comprising computer readable code to control at least one processing element to implement the method of claim 16.

30. A navigation system of an item, comprising:
a route selecting unit to select an optimal route for traversal by the item based on calculated performance indexes of a plurality of alternative routes for the traversal;
a performance index calculating unit to recalculate the performance indexes of the alternative routes during a current traversal of the selected optimal route based on received congestion information from a remote device, remote from the navigation system, of respectively identified sections of available traversals after a predetermined point in each of the alternative routes beyond a current point of the current traversal;
a requesting unit to request, from the remote device, the congestion information regarding each of the respective identified sections of the available traversals after the predetermined point in one or more of the alternative routes beyond the current point of the current traversal; and
a route changing unit to selectively update the optimal route during the current traversal based on the recalculated performance indexes,
wherein the remote device provides congestion information on a plurality of positions or sections to one or more items for respective item traversals,
wherein the performance index calculating unit recalculates the performance indexes of the alternative routes during the current traversal of the selected optimal route based on at least one predicted point in the sections beyond the current point of the current traversal for respective alternative routes where the item is predicted to encounter traffic congestion after the traffic congestion spreads from an origination point.

31. A navigation system, comprising:
a route selecting unit to select an optimal route to a destination point for traversal by an item to traverse based on calculated performance indexes of a plurality of alternative routes to the destination point for the traversal;
a performance index calculating unit to recalculate the performance indexes of the alternative routes during a current traversal of the selected optimal route based on received external information regarding sections of available traversals after a predetermined point in each alternative route beyond a current point of the current traversal; and
a route changing unit to selectively update the optimal route during the current traversal based on the recalculated performance indexes,
wherein the item is a vehicle and the navigation system is a navigation system within the vehicle, and
wherein the performance index calculating unit recalculates the performance indexes of the alternative routes during the current traversal of the selected optimal route based on at least one predicted point in the sections beyond the current point of the current traversal for respective alternative routes where the item is predicted by the performance index calculating unit to encounter predicted traffic congestion, wherein the predicted traffic congestion is a prediction of a spreading of known traffic congestion from a known origination point of the known traffic congestion.

32. A navigation method, comprising:
selecting an optimal route to a destination point for traversal by an item based on calculated performance indexes of a plurality of alternative routes to the destination point for the traversal;
recalculating the performance indexes of the alternative routes during a current traversal of the selected optimal route based on received congestion information from a remote device regarding sections of available traversals after a predetermined point in each alternative route beyond a current point of the current traversal; and
selectively updating and outputting the optimal route during the current traversal based on the recalculated performance indexes, wherein the remote device provides congestion information on a plurality of positions or sections to one or more items for respective item traversals, and is remote from a navigation system, of the item, performing the selecting, recalculating, and selective updating, and wherein the recalculating of the performance indexes of the alternative routes during the current traversal of the selected optimal route is based on at least one predicted point in the sections beyond the current point of the current traversal for respective alternative routes where the item is predicted by the recalculating of the performance indexes to encounter predicted traffic congestion, wherein the predicted traffic congestion is a prediction of a spreading of known traffic congestion from a known origination point of the known traffic congestion.

33. A navigation system included in an item, comprising:
a route selecting unit to select an optimal route to a destination point for traversal by the item based on calculated performance indexes of a plurality of alternative routes to the destination point for the traversal;
a performance index calculating unit to recalculate the performance indexes of the alternative routes during a current traversal of the selected optimal route based on received congestion information from a remote device, remote from the navigation system, regarding sections of available traversals after a predetermined point in each alternative route beyond a current point of the current traversal; and
a route changing unit to selectively update the optimal route during the current traversal based on the recalculated performance indexes,
wherein the remote device provides congestion information on a plurality of positions or sections to one or more items for respective item traversals,
wherein the item and the one or more items are mobile devices, and
wherein the performance index calculating unit recalculates the performance indexes of the alternative routes during the current traversal of the selected optimal route based on at least one predicted point in the sections beyond the current point of the current traversal for respective alternative routes where the item is predicted by the performance index calculating unit to encounter predicted traffic congestion, wherein the predicted traffic congestion is a prediction of a spreading of known traffic congestion from a known origination point of the known traffic congestion.

34. The navigation system of claim 5, wherein the performance index calculating unit recalculates the performance indexes of the alternative routes during the current traversal of the selected optimal route based on at least one predicted point in the sections beyond the current point of the current traversal for respective alternative routes where the item is predicted by the performance index calculating unit to encounter predicted traffic congestion, wherein the predicted traffic congestion is a prediction of a spreading of known traffic congestion from a known origination point of the known traffic congestion.

35. The navigation method of claim 16, wherein the recalculating of the performance indexes of the alternative routes during the current traversal of the selected optimal route is based on at least one predicted point in the sections beyond the current point of the current traversal for respective alternative routes where the item is predicted by the recalculating of the performance indexes to encounter predicted traffic congestion, wherein the predicted traffic congestion is a prediction of a spreading of known traffic congestion from a known origination point of the known traffic congestion.

36. The navigation system of claim 1, wherein the performance index calculating unit recalculates the performance indexes of the alternative routes during the current traversal of the selected optimal route based on at least one predicted point in the sections beyond the current point of the current traversal for respective alternative routes where the item is predicted by the performance index calculating unit to encounter predicted traffic congestion, wherein the predicted traffic congestion is a prediction of a spreading of known traffic congestion from a known origination point of the known traffic congestion.

* * * * *